US010292492B2

United States Patent
Chen et al.

(10) Patent No.: US 10,292,492 B2
(45) Date of Patent: May 21, 2019

(54) SLIDE RAIL MECHANISM AND BRACKET DEVICE THEREOF

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shun-Ho Yang, Kaohsiung (TW); Wei-Chen Chang, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 84 days.

(21) Appl. No.: 15/587,412

(22) Filed: May 5, 2017

(65) Prior Publication Data
US 2018/0199712 A1    Jul. 19, 2018

(30) Foreign Application Priority Data
Jan. 16, 2017  (TW) .............................. 106101607 A

(51) Int. Cl.
*A47B 88/43* (2017.01)
*F16C 29/00* (2006.01)
*A47B 88/49* (2017.01)

(52) U.S. Cl.
CPC .............. *A47B 88/43* (2017.01); *A47B 88/49* (2017.01); *F16C 29/004* (2013.01)

(58) Field of Classification Search
CPC ......... A47B 88/43; A47B 88/49; A47B 96/07; A47B 96/06; A47B 88/407; F16C 29/004; H05K 7/1489; H05K 7/183
USPC ..................................................... 312/334.4
See application file for complete search history.

(56) References Cited

U.S. PATENT DOCUMENTS

| 6,830,300 | B2 * | 12/2004 | Lauchner | A47B 88/43 |
| | | | | 312/223.1 |
| 6,935,711 | B1 * | 8/2005 | Naue | A47B 88/43 |
| | | | | 312/223.1 |
| 6,957,878 | B2 * | 10/2005 | Greenwald | A47B 88/43 |
| | | | | 312/223.1 |
| 7,731,142 | B2 * | 6/2010 | Chen | A47B 88/43 |
| | | | | 248/244 |

(Continued)

FOREIGN PATENT DOCUMENTS

CN         103945671        1/2017

*Primary Examiner* — Daniel J Troy
*Assistant Examiner* — Timothy M Ayres
(74) *Attorney, Agent, or Firm* — Winston Hsu

(57) ABSTRACT

A slide rail mechanism includes a supporting frame, a bracket, a fastening member and an elastic member. The bracket and the supporting frame are movable relative to each other. The bracket includes a longitudinal wall and at least one mounting member adjacent to the longitudinal wall. The fastening member is transversely movable relative to the bracket. The elastic member is configured to provide an elastic force to the fastening member. When the supporting frame is moved relative to the bracket from a first position to a second position, the supporting frame is configured to drive the fastening member to transversely move from a first operating position to a second operating position.

27 Claims, 8 Drawing Sheets

(56) References Cited

U.S. PATENT DOCUMENTS

| | | | | |
|---|---|---|---|---|
| 7,798,581 | B2* | 9/2010 | Chen | H05K 7/1489 |
| | | | | 211/26 |
| 8,104,626 | B2* | 1/2012 | Huang | A47B 88/43 |
| | | | | 211/26 |
| 8,727,138 | B2* | 5/2014 | Dittus | H05K 7/183 |
| | | | | 211/26 |
| 9,125,489 | B2* | 9/2015 | Chen | A47B 88/044 |
| 9,370,120 | B2* | 6/2016 | Chen | A47B 96/025 |
| 9,629,460 | B1 | 4/2017 | Chen | |
| 10,070,555 | B1* | 9/2018 | Chen | H05K 7/1489 |
| 2005/0196230 | A1* | 9/2005 | Dubon | H05K 7/1489 |
| | | | | 403/327 |

* cited by examiner

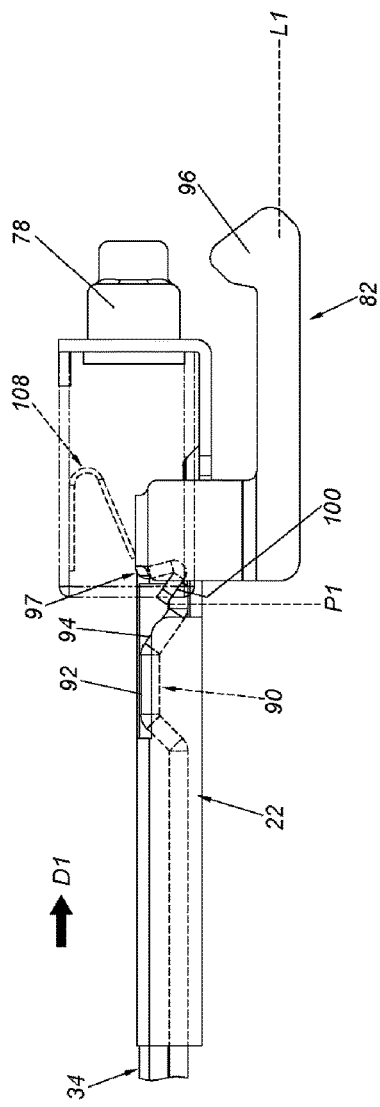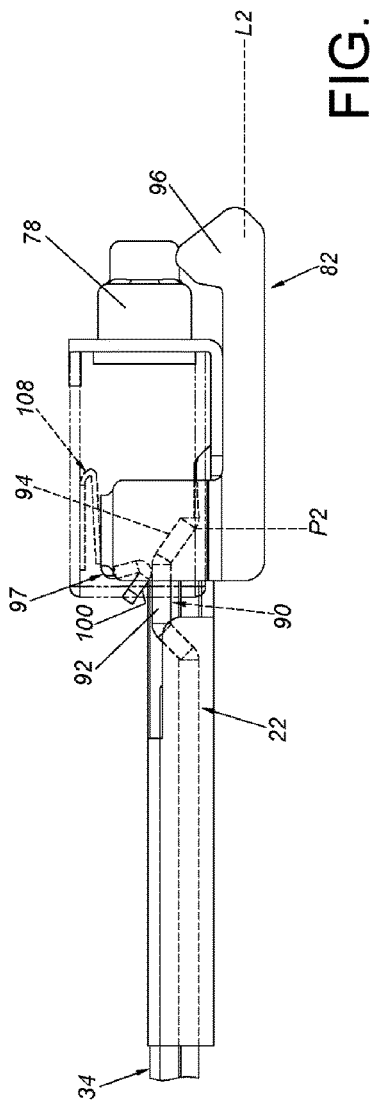

SLIDE RAIL MECHANISM AND BRACKET DEVICE THEREOF

BACKGROUND OF THE INVENTION

1. Field of the Invention

The present invention relates to a slide rail mechanism, and more particularly, to a slide rail mechanism capable of being mounted to a rack through one-man operation.

2. Description of the Prior Art

In a rack system, a slide rail assembly is configured to mount a carried object to a rack. Wherein, the slide rail assembly usually comprises a first rail and a second rail movable relative to the first rail. Preferably, the slide rail assembly further comprises a third rail mounted between the first rail and the second rail. The third rail is configured to extend a traveling distance of the second rail relative to the first rail. Wherein, the first rail can be mounted to two posts of the rack through brackets. On the other hand, the second rail is configured to mount the carried object. Specifically, two portions of the first rail (such as a front part and a rear part) are respectively mounted to two posts of the rack through the brackets.

U.S. Pat. No. 8,371,454 B2 discloses a bracket assembly for a rack, which comprises a fastening member (40) for locking a post (86) of a rack (84). Wherein, the fastening member (40) is pivotally connected to a side plate (12) of a bracket (10) by a pin (18). Briefly, in current related technologies, the fastening member (40) is usually mounted to the bracket (10) by pivoting. As such, the fastening member (40) can be only rotated relative to the bracket and is not able to be linearly moved relative to the bracket.

However, for different market requirements, it is important to develop various products with fastening members configured to be moved in different ways.

SUMMARY OF THE INVENTION

The present invention relates to a slide rail mechanism and a bracket device, wherein a fastening member of the bracket device mechanism is configured to be operated to transversely move relative to the bracket.

According to an embodiment of the present invention, a slide rail mechanism comprises a rail member, a first supporting frame, a second supporting frame, a first bracket, a fastening member and an elastic member. The first supporting frame is movable relative to the rail member. The second supporting frame is movable relative to the first supporting frame. The first bracket and the second supporting frame are movable relative to each other. The first bracket comprises a longitudinal wall and at least one mounting member adjacent to the longitudinal wall. The elastic member is configured to provide an elastic force to the fastening member. Wherein, when the second supporting frame is moved relative to the first bracket along a direction from a first position to a second position, the fastening member is transversely moved relative to the first bracket from an unlocking position to a locking position. Wherein, when the fastening member is located at the unlocking position, a fastening part of the fastening member is away from the at least one mounting member of the first bracket. Wherein, when the fastening member is located at the locking position, the fastening part of the fastening member is adjacent to the at least one mounting member of the first bracket.

Preferably, the slide rail mechanism further comprises a supporting rail connected to the rail member. The first supporting frame is movable relative to the rail member through the supporting rail.

Preferably, the supporting rail comprises an upper wall, a lower wall and a side wall connected between the upper wall and the lower wall. A first passage is defined by the upper wall, the lower wall and the side wall. At least one portion of the first supporting frame is movably mounted within the first passage.

Preferably, the slide rail mechanism further comprises a second bracket. The second bracket has a longitudinal wall and at least one mounting member adjacent to the longitudinal wall of the second bracket. The longitudinal wall of the second bracket is connected to the side wall of the supporting rail Preferably, the first supporting frame and the second supporting frame are movable relative to each other through a second passage.

Preferably, the first supporting frame has an opening and at least one contact wall adjacent to the opening. The second supporting frame comprises an abutting part configured to pass through the opening. The abutting part is smaller than the opening.

Preferably, the longitudinal wall of the first bracket has a first wall section and a second wall section. A space is defined between the first wall section and the second wall section. The first bracket and the second supporting frame are movable relative to each other through the space.

Preferably, one of the second supporting frame and the first bracket comprises a limiting structure. The second supporting frame and the first bracket are movable relative to each other within a limited range defined by the limiting structure.

Preferably, the first bracket further comprises an end wall substantially perpendicularly connected to the longitudinal wall of the first bracket. The at least one mounting member is mounted on the end wall.

Preferably, the fastening member further comprises a leg part and an arm part, the arm part is connected between the leg part and the fastening part. The second supporting frame comprises a supporting structure. When the second supporting frame is located at the first position relative to the first bracket, the supporting structure does not support the leg part of the fastening member, such that the fastening member is held at the unlocking position by the elastic member. When the second supporting frame is located at the second position relative to the first bracket, the supporting structure supports the leg part of the fastening member to suppress the elastic force of the elastic member, such that the fastening member is held at the locking position.

Preferably, one of the supporting structure and the leg part comprises a guiding feature. The supporting structure is configured to abut against the leg part of the fastening member through the guiding feature during a process of the second supporting frame being moved relative to the first bracket from the first position to the second position.

Preferably, the slide rail mechanism further comprises a base. The base has a contact wall and a supporting wall. The supporting wall is configured to support the leg part of the fastening member. The elastic member has a first part and a second part. The first part abuts against the contact wall. The second part abuts against the leg part of the fastening member.

According to another embodiment of the present invention, a bracket device of a slide rail mechanism comprises a supporting frame, a bracket, a fastening member and an elastic member. The bracket and the supporting frame are movable relative to each other. The bracket comprises a longitudinal wall and at least one mounting member adjacent to the longitudinal wall. The fastening member is transversely movable relative to the bracket. The elastic member is configured to provide an elastic force to the fastening member. Wherein, when the supporting frame is moved relative to the bracket from a first position to a second position, the supporting frame is configured to drive the fastening member to transversely move from a first operating position to a second operating position.

According to another embodiment of the present invention, a bracket device of a slide rail mechanism comprises a bracket and a fastening member. The bracket comprises a longitudinal wall and at least one mounting member adjacent to the longitudinal wall. The fastening member is transversely movable relative to the bracket. Wherein, the fastening member is configured to be operated to transversely move relative to the bracket between an unlocking position and a locking position. Wherein, when the fastening member is located at the unlocking position, a fastening part of the fastening member is away from the at least one mounting member of the bracket. Wherein, when the fastening member is located at the locking position, the fastening part of the fastening member is adjacent to the at least one mounting member of the bracket.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a diagram showing a supporting frame of the slide rail mechanism being located at a first position relative to the bracket, and the fastening member being located at an unlocking position relative to the bracket according to an embodiment of the present invention.

FIG. 7 is a diagram showing the supporting frame of the slide rail mechanism being located at a second position relative to the bracket, and the fastening member being located at a locking position relative to the bracket according to an embodiment of the present invention.

DETAILED DESCRIPTION

Figure 1:
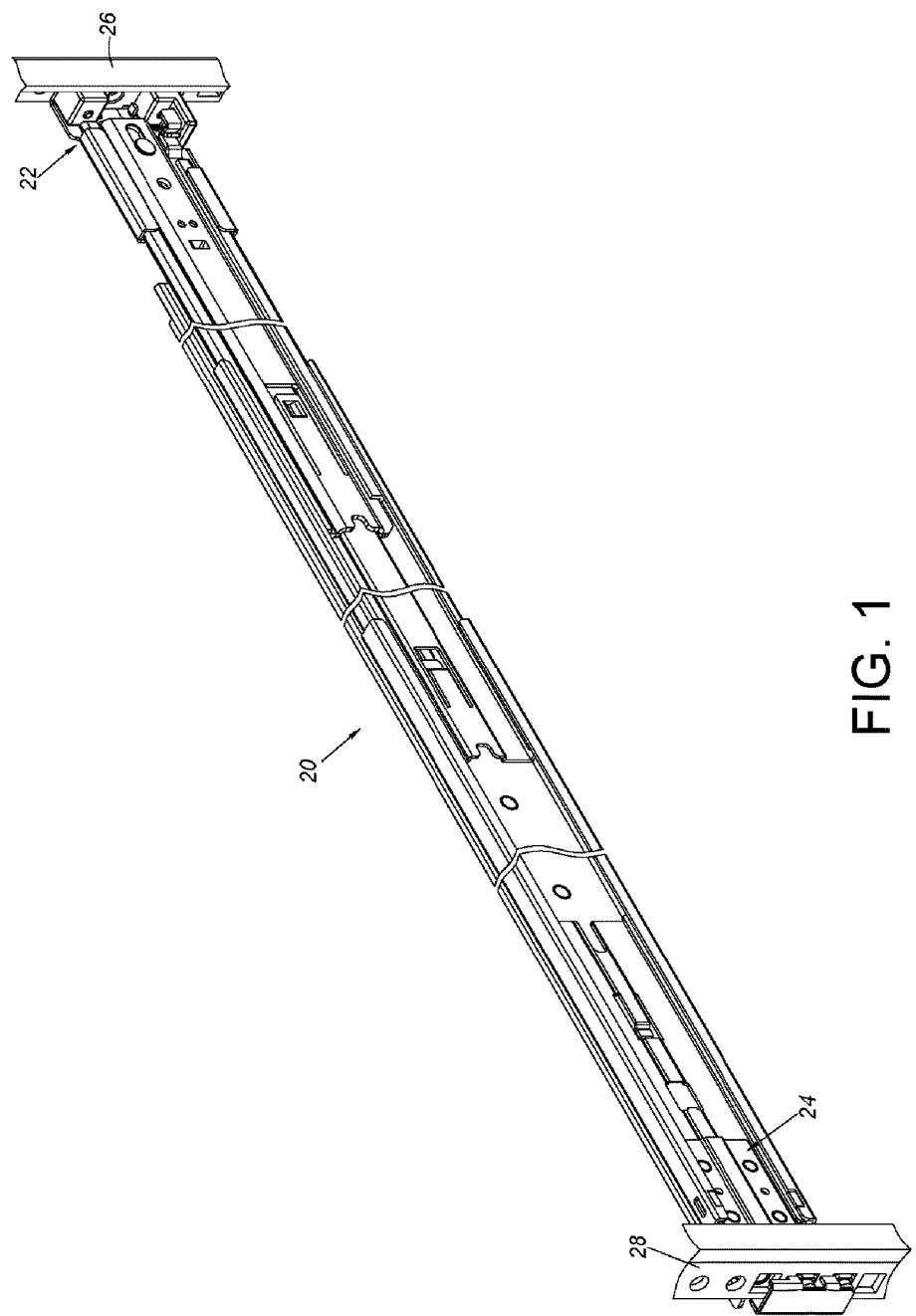
FIG. 1 is a diagram showing a slide rail mechanism being mounted to a first post and a second post of a rack according to an embodiment of the present invention.

As shown in FIG. 1, a slide rail mechanism 20 can be mounted to a first post 26 and a second post 28 of a rack respectively through a first bracket 22 and a second bracket 24 according to an embodiment of the present invention.

Figure 2:
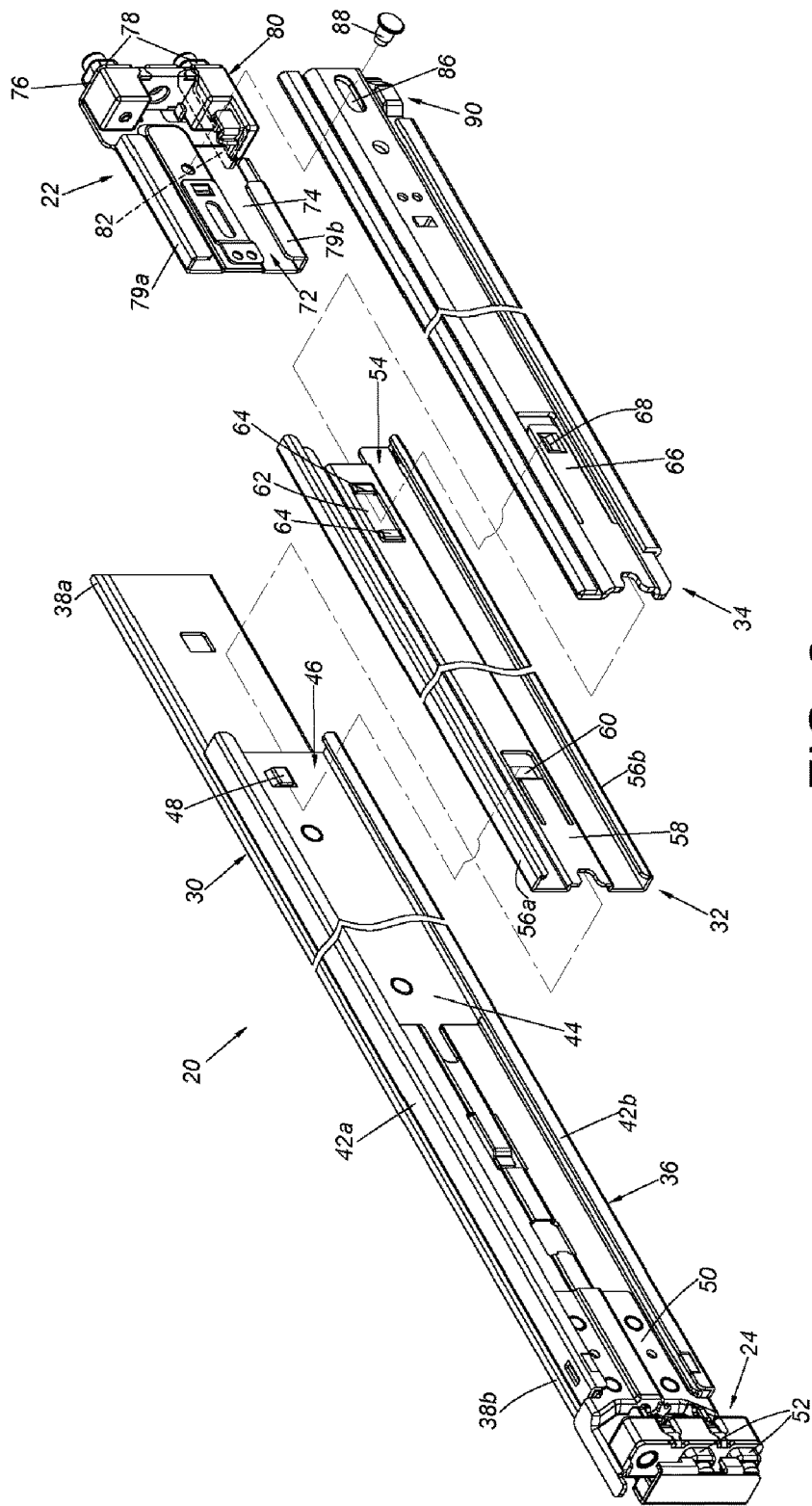
FIG. 2 is an exploded view of the slide rail mechanism according to an embodiment of the present invention.
Figure 3:
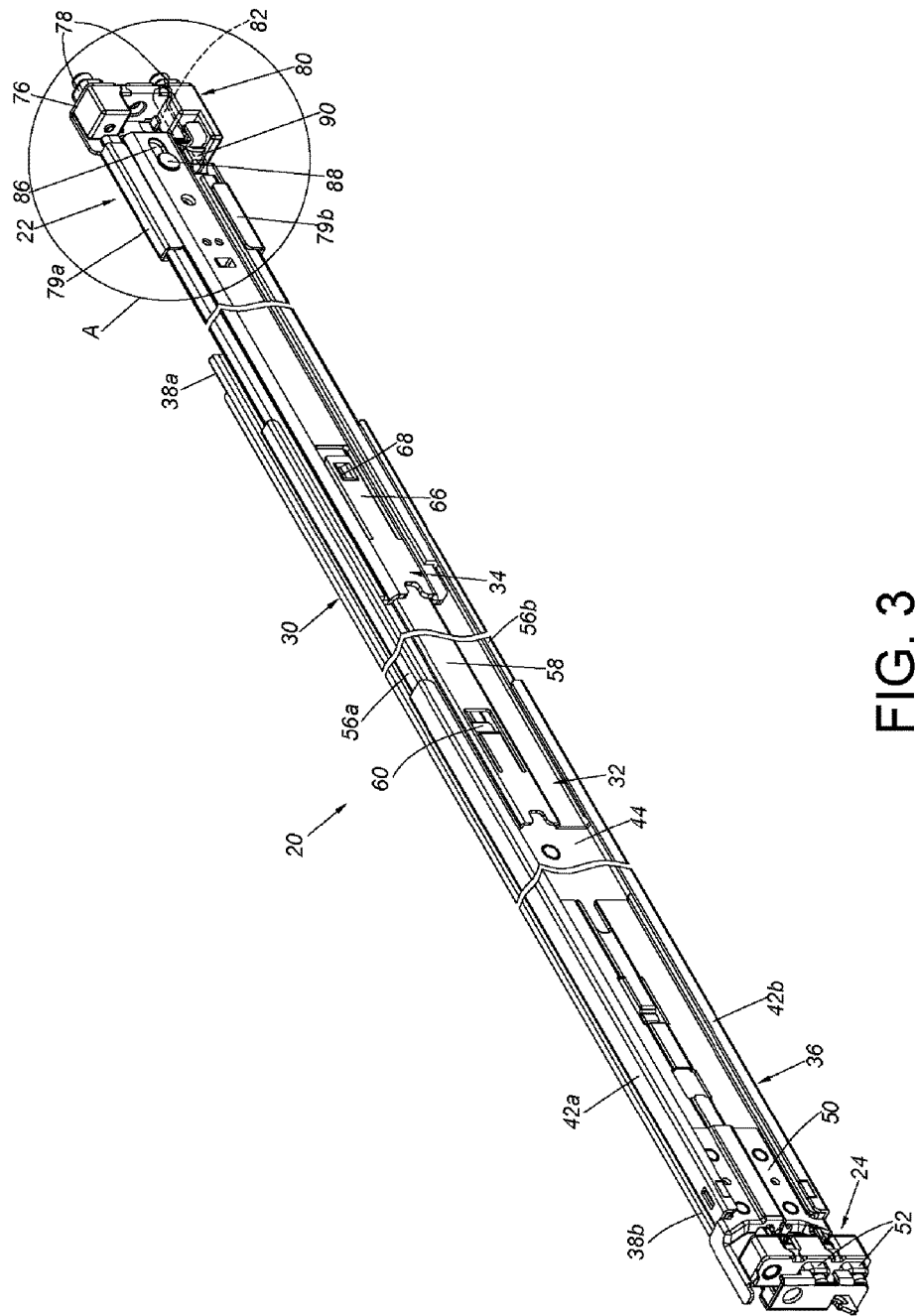
FIG. 3 is a diagram showing the slide rail mechanism according to an embodiment of the present invention.

As shown in FIG. 2 and FIG. 3, the slide rail mechanism 20 comprises a rail member 30, a first supporting frame 32, a second supporting frame 34 and the first bracket 22. Preferably, the slide rail mechanism 20 further comprises a supporting rail 36.

The rail member 30 has a first end part 38a and a second end part 38b located opposite to the first end part 38a. The supporting rail 36 is connected, such as fixedly connected, to a back side of the rail member 30, such that the supporting rail 36 can be seen as a portion of the rail member 30. For example, the supporting rail 36 can be connected to the rail member 30 by riveting, screwing or welding. Furthermore, the supporting rail 36 is longitudinally arranged and comprises an upper wall 42a, a lower wall 42b and a side wall 44 connected between the upper wall 42a and the lower wall 42b. A first passage 46 is defined by the upper wall 42a, the lower wall 42b and the side wall 44. Preferably, the side wall 44 has a first limiting feature 48 located within the first passage 46. In the present embodiment, the first limiting feature 48 is a protrusion. The second bracket 24 has a longitudinal wall 50 and at least one mounting member 52 located adjacent to one end of the longitudinal wall 50. The longitudinal wall 50 is connected to the side wall 44 of the supporting rail 36. Preferably, the second bracket 24 is located adjacent to the second end part 38b of the rail member 30.

The first supporting frame 32 is longitudinally arranged and movable relative to the rail member 30. For example, a portion of the first supporting frame 32 is movably mounted within the first passage 46 of the supporting rail 36. The first supporting frame 32 is movable relative to the rail member 30 through the first passage 46 of the supporting rail 36, but the present invention is not limited thereto. The first supporting frame 32 and the second supporting frame 34 are movable relative to each other through a second passage 54. In the present embodiment, the first supporting frame 32 has the second passage 54. In particular, the first supporting frame 32 has an upper supporting wall 56a, a lower supporting wall 56b and a side supporting wall 58 connected between the upper supporting wall 56a and the lower supporting wall 56b. The second passage 54 is defined by the upper supporting wall 56a, the lower supporting wall 56b and the side supporting wall 58. Furthermore, the first supporting frame 32 has a second limiting feature 60. The second limiting feature 60 is connected to the side supporting wall 58 of the first supporting frame 32, and located at a position corresponding to the first limiting feature 48 of the supporting rail 36. In the present embodiment, the second limiting feature 60 is an extension arm. Preferably, the first supporting frame 32 further has an opening 62 and at least one contact part 64 adjacent to the opening 62. Wherein, the opening 62 is longitudinally arranged. In the present embodiment, the first supporting frame 32 has two contact parts 64 located at two sides of the opening 62.

The second supporting frame 34 is longitudinally arranged and movable relative to the first supporting frame 32. For example, a portion of the second supporting frame 34 is movably mounted within the second passage 54 of the first supporting frame 32. The second supporting frame 34 is movable relative to the first supporting frame 32 through the second passage 54 of the first supporting frame 32, but the present invention is not limited thereto. The second supporting frame 34 comprises an elastic arm 66 and an abutting part 68 arranged on the elastic arm 66. Wherein, the elastic arm 66 is extended from the second supporting frame 34. The abutting part 68 is configured to pass through the opening 62 of the first supporting frame 32. The abutting part 68 is smaller than the opening 62.

The first bracket 22 and the second supporting frame 34 are movable relative to each other. Preferably, the first bracket 22 is movably mounted to the second supporting frame 34 and is adjustable to be adjacent to the first end part 38a of the rail member 30. Furthermore, the first bracket 22 and the second supporting frame 34 are movable relative to each other through a space 72. In the present embodiment, the space 72 is provided by the first bracket 22.

Figure 5:
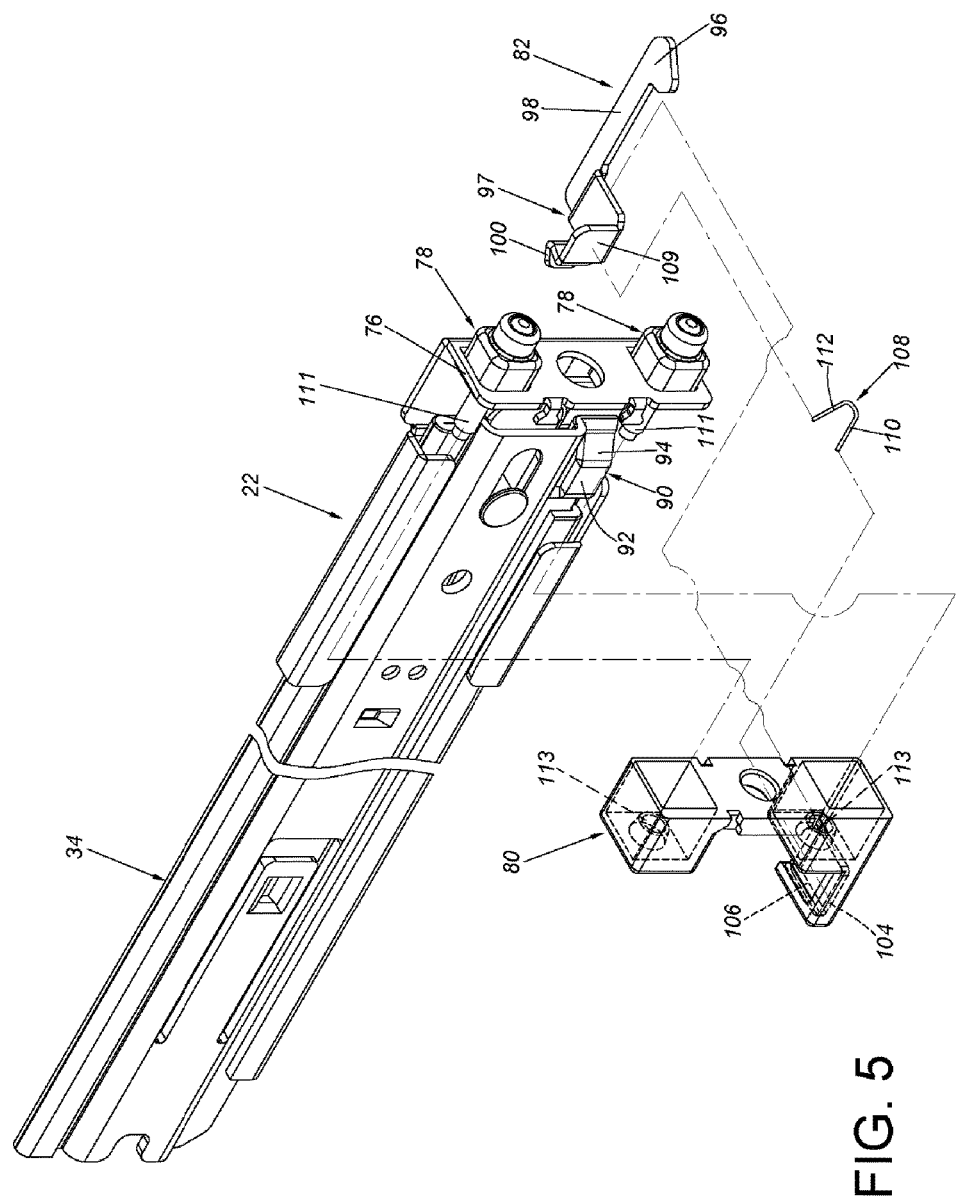
FIG. 5 is an exploded view of a bracket, a fastening member, a base and an elastic member of the slide rail mechanism according to an embodiment of the present invention.

In particular, the first bracket 22 comprises a longitudinal wall 74, an end wall 76 and at least one mounting member 78. An upper part and a lower part of the longitudinal wall 74 are respectively arranged with a first wall section 79a and a second wall section 79b. A space is defined between the first wall section 79a and the second wall section 79b. The end wall 76 is substantially perpendicularly connected to the longitudinal wall 74. The at least one mounting member 78 is arranged on the end wall 76 through a base 80. The base 80 is fixed to the first bracket 22 and can be seen as a portion of the first bracket 22, and the base 80 is adjacent to the longitudinal wall 74. The slide rail mechanism 20 further comprises a fastening member 82 (as shown in FIG. 5) movable relative to the first bracket 22. Wherein, the first bracket 22 and the fastening member 82 (and the second supporting frame 34) constitute a bracket device.

Preferably, one of the first bracket 22 and the second supporting frame 34 comprises a limiting structure 86. The second supporting frame 34 and the first bracket 22 are movable relative to each other within a limited range defined by the limiting structure 86. In the present embodiment, the limiting structure 86 can be a bounded elongated hole, and the slide rail mechanism 20 further comprises a connecting member 88 passing through a portion of the limiting structure 86 for connecting the second supporting frame 34 to the first bracket 22.

Figure 4:
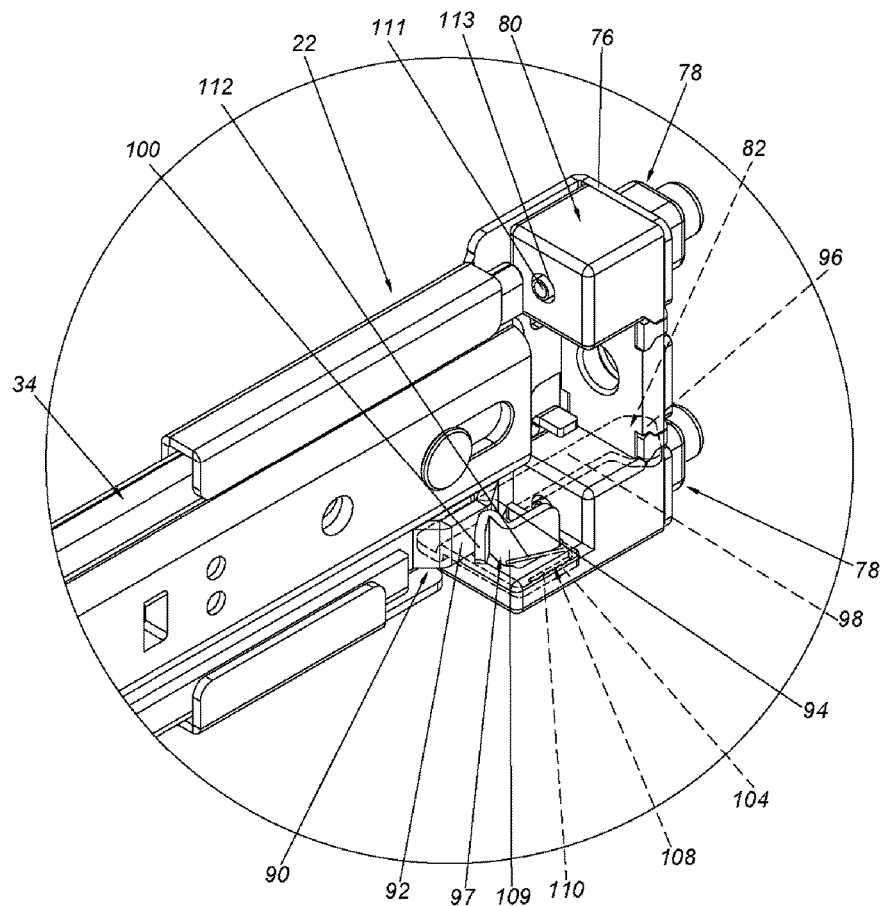
FIG. 4 is an enlarged view of an area A of FIG. 3.

As shown in FIG. 4 and FIG. 5, the second supporting frame 34 comprises a supporting structure 90. The supporting structure 90 can be a protrusion. Preferably, the supporting structure 90 comprises a supporting section 92 and at least one guiding feature 94 adjacent to the supporting section 92. Wherein, the at least one guiding feature 94 has an inclined surface or a curved surface.

The fastening member 82 comprises a fastening part 96, a leg part 97 and an arm part 98. The arm part 98 is connected between the fastening part 96 and the leg part 97. Preferably, the leg part 97 comprises a guiding feature 100 corresponding to the guiding feature 94 of the supporting structure 90. The guiding feature 100 has an inclined surface or a curved surface.

Preferably, the base 80 has a contact wall 104 and a supporting wall 106 adjacent to the contact wall 104. The supporting wall 106 is configured to support the leg part 97 of the fastening member 82. On the other hand, the slide rail mechanism 20 further comprises an elastic member 108 configured to provide an elastic force to the fastening member 82. In the present embodiment, the elastic member 108 is located between the base 80 of the first bracket 22 and a lateral side 109 of the fastening member 82. In particular, the elastic member 108 has a first part 110 and a second part 112 connected to the first part 110. The first part 110 abuts against the contact wall 104 of the base 80. The second part 112 abuts against the fastening member 82, such as abutting against the lateral side 109 of the leg part 97 of the fastening member 82. Preferably, the base 80 is configured to mount the at least one mounting member 78. For example, the at least one mounting member 78 has an extension part 111 passing through the end wall 78 and mounted to a connection part 113 of the base 80.

As shown in FIG. 6, when the second supporting frame 34 is located at a first position P1 relative to the first bracket 22, the supporting structure 90 of the second supporting frame 34 is a predetermined distance away from the leg part 97 of the fastening member 82, and the supporting section 92 of the supporting structure 90 does not support the leg part 97 of the fastening member 82. On the other hand, the fastening member 82 can be held at an unlocking position L1 (or a first operating position) by the elastic force of the elastic member 108. Wherein, when the fastening member 82 is located at the unlocking position L1, the fastening part 96 of the fastening member 82 is away from the at least one mounting member 78 of the first bracket 22.

As shown in FIG. 7, during a process of the second supporting frame 34 being moved relative to the first bracket 22 along a direction D1 from the first position P1 to a second position P2, the supporting structure 90 of the second supporting frame 34 is configured to drive the fastening member 82 to move. When the supporting frame is moved to the second position P2, the supporting section 92 of the supporting structure 90 of the second supporting frame 34 is configured to support the leg part 97 of the fastening member 82 to suppress the elastic force of the elastic member 108, such that the fastening member 82 is moved (such as transversely moved or laterally moved) relative to the first bracket 22 from the unlocking position L1 to a locking position L2 (or a second operating position), such that the fastening member 82 is held at the locking position L2. Wherein, when the fastening member 82 is located at the locking position L2, the fastening part 96 of the fastening member 82 is adjacent to the at least one mounting member 78 of the first bracket 22. In other words, when the second supporting frame 34 is moved relative to the first bracket 22 along the direction D1 from the first position P1 to the second position P2, the fastening member 82 is correspondingly moved relative to the first bracket 22 from the unlocking position L1 to the locking position L2.

Preferably, during the process of moving the second supporting frame 34 relative to the first bracket 22 from the first position P1 to the second position P2, the supporting structure 90 can easily abut against the leg part 97 of the fastening member 82 through the guiding feature 94 (or 100), so as to move the fastening member 82 from the unlocking position L1 to the locking poison L2.

Figure 8:
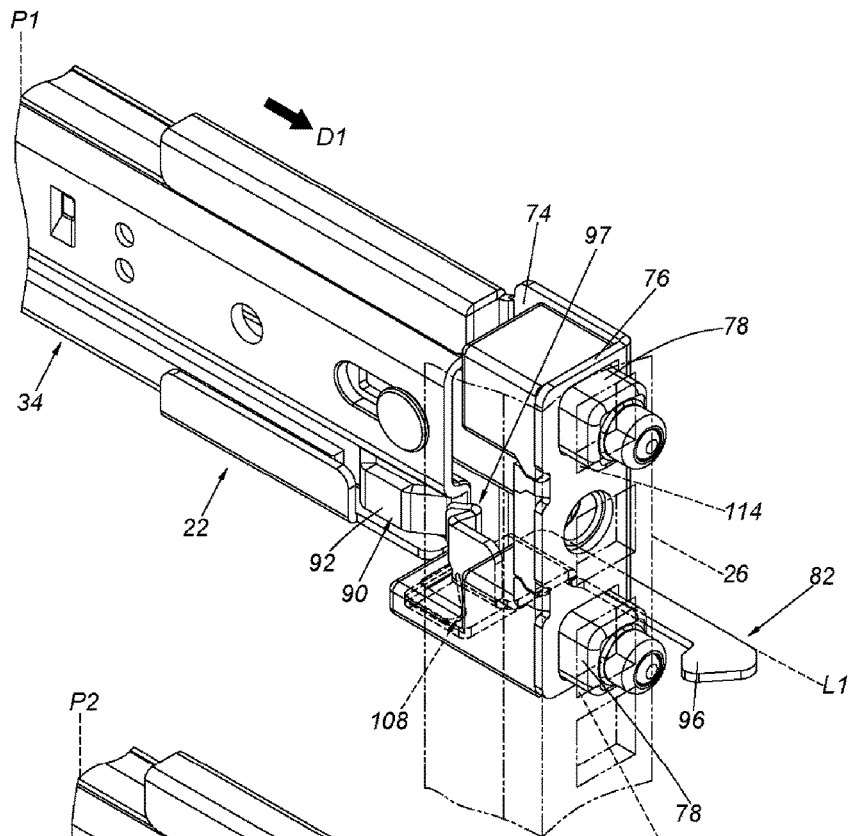
FIG. 8 is a diagram showing the supporting frame of the slide rail mechanism being located at the first position relative to the bracket, and the fastening member being located at the unlocking position relative to the posts according to an embodiment of the present invention.

As shown in FIG. 8, the first bracket 22 is configured to be mounted to a post, such as the first post 26. In particular, the at least one mounting member 78 of the first bracket 22 is configured to be mounted to a corresponding hole 114 of the first post 26. On the other hand, the second supporting frame 34 is located at the first position P1 relative to the first bracket 22, and the supporting section 92 of the supporting structure 90 does not support the leg part 97 of the fastening member 82. In such state, the fastening member 82 can be held at the unlocking position L1 in response to the elastic force of the elastic member 108. Wherein, when the fastening member 82 is located at the unlocking position L1, the fastening part 96 of the fastening member 82 is away from the at least one mounting member 78 of the first bracket 22, and the fastening part 96 of the fastening member 78 does not lock the first post 26.

Figure 9:
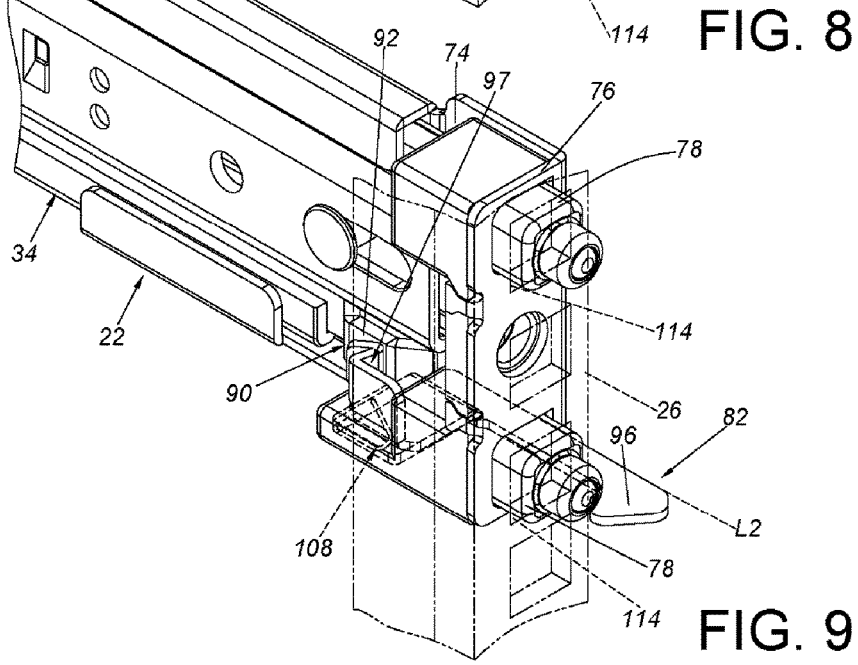
FIG. 9 is a diagram showing the supporting frame of the slide rail mechanism being located at the second position relative to the bracket, and the fastening member being located at the locking position relative to the posts according to an embodiment of the present invention.

As shown in FIG. 9, after the at least one mounting member 78 of the first bracket 22 of the slide rail mechanism 20 is mounted to the corresponding hole 114 of the first post 26, the first bracket 22 (such as the end wall 76 of the first bracket 22) is configured to abut against the first post 26. Furthermore, a user can apply a force along the direction D1, such as applying a force to the slide rail mechanism 20 along the direction D1, so as to move the second supporting frame 34 relative to the first bracket 22 along the first direction D1 from the first position P1 to the second position P2.

When the second supporting frame 34 is moved relative to the first bracket 22 from the first position P1 to the second position P2, the supporting section 92 of the supporting structure 90 is configured to support the leg part 97 of the fastening member 82 to suppress the elastic force of the elastic member 108, such that the fastening member 82 is transversely moved relative to the longitudinal wall 74 of the first bracket 22 from the unlocking position L1 to the locking position L2. Wherein, when the fastening member 82 is located at the locking position L2, the fastening part 96 of the fastening member 82 is adjacent to the at least one mounting member 78 of the first bracket 22, and the fastening part 96 of the fastening member 82 is configured to lock the first post 26. As such, an operation of mounting the first bracket 22 to the first post 26 is completed.

Moreover, after the first bracket 22 is mounted to the first post 26 (as shown in FIG. 9), the user can operate the second supporting frame 34 to move relative to the first bracket 22 along another direction opposite to the direction D1 from the second position P2 to the first position P1 (please refer to FIG. 8), such that the supporting structure 90 of the second supporting frame 34 no longer supports the leg part 97 of the fastening member 82. Accordingly, the fastening member 82 can return to the unlocking position L1 from the locking position L2 relative to the first bracket 22 in response to the elastic force of the elastic member 108, such that the fastening part 96 of the fastening member 82 no longer locks the first post 26. In addition, the at least one mounting member 78 can be moved out of the corresponding hole 114 of the first post 26, so as to detach the first bracket 22 from the first post 26.

Figure 10:
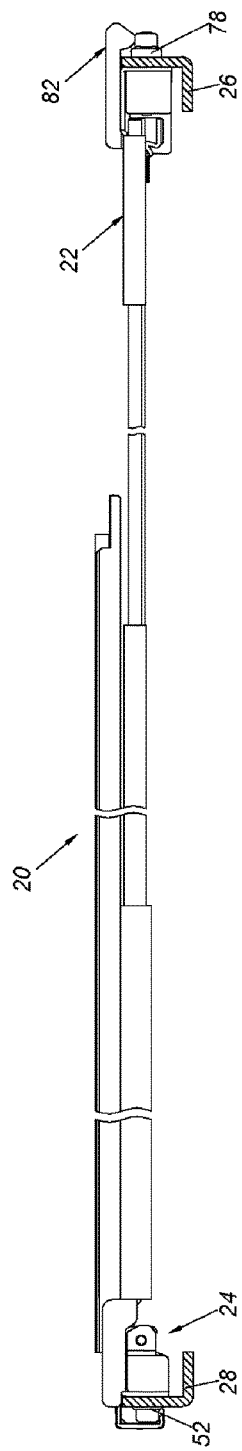
FIG. 10 is a diagram showing the slide rail mechanism being mounted to the first post and the second post of the rack according to an embodiment of the present invention.

As shown in FIG. 10, after the first bracket 22 is mounted to the first post 26, the user can mount the at least one mounting member 52 of the second bracket 24 to a corresponding hole of the second post 28, such that an operation of mounting the slide rail mechanism 20 to the rack is completed. Since a process of mounting the second bracket 24 to the second post 28 is well known to those skilled in the art, no further illustration is provided for simplification.

Therefore, the slide rail mechanism of the present invention is characterized in that:

1. According to the above arrangement, the slide rail mechanism can be conveniently and quickly mounted to or detached from the two posts of the rack through one-man operation in front of the rack.
2. The fastening member is movable (transversely movable or laterally movable) relative to the first bracket between the unlocking position and the locking position, such that the first bracket is applicable to posts with different widths.
3. The fastening member is driven to move from the unlocking position to the locking position in response to the movement of the second supporting frame relative to the first bracket.

4. The first supporting frame and the second supporting frame can be adjusted to move relative to the rail member (or the supporting rail), such that the slide rail mechanism is applicable to the racks with different depths. In other words, the slide rail mechanism is applicable to two posts at different distances from each other.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail mechanism, comprising:
   a rail member;
   a first supporting frame movable relative to the rail member;
   a second supporting frame movable relative to the first supporting frame;
   a first bracket, the first bracket and the second supporting frame being movable relative to each other, the first bracket comprising a longitudinal wall and at least one mounting member adjacent to the longitudinal wall;
   a fastening member; and
   an elastic member configured to provide an elastic force to the fastening member;
   wherein when the second supporting frame is moved relative to the first bracket along a direction from a first position to a second position, the fastening member is transversely moved relative to the first bracket from an unlocking position to a locking position;
   wherein the first supporting frame and the second supporting frame are movable relative to each other through a second passage;
   wherein when the fastening member is located at the unlocking position, a fastening part of the fastening member is away from the at least one mounting member of the first bracket;
   wherein when the fastening member is located at the locking position, the fastening part of the fastening member is adjacent to the at least one mounting member of the first bracket.

2. The slide rail mechanism of claim 1, further comprising a supporting rail connected to the rail member, the first supporting frame being movable relative to the rail member through the supporting rail.

3. The slide rail mechanism of claim 2, wherein the supporting rail comprises an upper wall, a lower wall and a side wall connected between the upper wall and the lower wall, a first passage is defined by the upper wall, the lower wall and the side wall, at least one portion of the first supporting frame is movably mounted within the first passage.

4. The slide rail mechanism of claim 3, further comprising a second bracket, wherein the second bracket has a longitudinal wall and at least one mounting member adjacent to the longitudinal wall of the second bracket, and the longitudinal wall of the second bracket is connected to the side wall of the supporting rail.

5. The slide rail mechanism of claim 1, wherein the first supporting frame has an opening and at least one contact wall adjacent to the opening, the second supporting frame comprises an abutting part configured to pass through the opening, and the abutting part is smaller than the opening.

6. The slide rail mechanism of claim 1, wherein the longitudinal wall of the first bracket has a first wall section and a second wall section, a space is defined between the first wall section and the second wall section, the first bracket and the second supporting frame are movable relative to each other through the space.

7. The slide rail mechanism of claim 1, wherein one of the second supporting frame and the first bracket comprises a limiting structure, the second supporting frame and the first bracket are movable relative to each other within a limited range defined by the limiting structure.

8. The slide rail mechanism of claim 1, wherein the first bracket further comprises an end wall substantially perpendicularly connected to the longitudinal wall of the first bracket, the at least one mounting member is mounted on the end wall.

9. The slide rail mechanism of claim 1, wherein the fastening member further comprises a leg part and an arm part, the arm part is connected between the leg part and the fastening part, the second supporting frame comprises a supporting structure; when the second supporting frame is located at the first position relative to the first bracket, the supporting structure does not support the leg part of the fastening member, such that the fastening member is held at the unlocking position by the elastic member; when the second supporting frame is located at the second position relative to the first bracket, the supporting structure supports the leg part of the fastening member to suppress the elastic force of the elastic member, such that the fastening member is held at the locking position.

10. The slide rail mechanism of claim 9, wherein one of the supporting structure and the leg part comprises a guiding feature, the supporting structure is configured to abut against the leg part of the fastening member through the guiding feature during a process of the second supporting frame being moved relative to the first bracket from the first position to the second position.

11. The slide rail mechanism of claim 9, further comprising a base, wherein the base has a contact wall and a supporting wall, the supporting wall is configured to support the leg part of the fastening member, the elastic member has a first part and a second part, the first part abuts against the contact wall, the second part abuts against the leg part of the fastening member.

12. A bracket device of a slide rail mechanism, comprising:
a supporting frame;
a bracket, the bracket and the supporting frame being movable relative to each other, the bracket comprising a longitudinal wall and at least one mounting member adjacent to the longitudinal wall;
a fastening member transversely movable relative to the bracket; and
an elastic member configured to provide an elastic force to the fastening member;
wherein when the supporting frame is moved relative to the bracket from a first position to a second position, the supporting frame is configured to drive the fastening member to transversely move from a first operating position to a second operating position;
wherein when the fastening member is located at the first operating position, a fastening part of the fastening member is away from the at least one mounting member of the bracket when the fastening member is located at the second operating position, the fastening part of the fastening member is adjacent to the at least one mounting member of the bracket;
wherein the fastening member further comprises a leg part and an arm part, the arm part is connected between the leg part and the fastening part, the supporting frame comprises a supporting structure; when the supporting frame is located at the first position relative to the bracket, the supporting structure does not support the leg part of the fastening member, such that the fastening member is held at the first operating position by the elastic member; when the supporting frame is located at the second position relative to the bracket, the supporting structure supports the leg part of the fastening member to suppress the elastic force of the elastic member, such that the fastening member is held at the second operating position.

13. The bracket device of the slide rail mechanism of claim 12, wherein one of the supporting frame and the bracket has a first wall section and a second wall section, a space is defined between the first wall section and the second wall section, and the bracket and the supporting frame are movable relative to each other through the space.

14. The bracket device of the slide rail mechanism of claim 12, wherein one of the supporting structure and the leg part comprises a guiding feature, the supporting structure is configured to abut against the leg part of the fastening member through the guiding feature during a process of the supporting frame being moved relative to the bracket from the first position to the second position.

15. The bracket device of the slide rail mechanism of claim 12, further comprising a base, wherein the base has a contact wall and a supporting wall, the supporting wall is configured to support the leg part of the fastening member, the elastic member has a first part and a second part, the first part abuts against the contact wall, the second part abuts against the leg part of the fastening member.

16. A bracket device of a slide rail mechanism, the slide rail mechanism comprising a rail member, the bracket device comprising:
a first supporting frame movable relative to the rail member;
a second supporting frame movable relative to the first supporting frame;
a bracket comprising a longitudinal wall and at least one mounting member adjacent to the longitudinal wall; and
a fastening member transversely movable relative to the bracket;
wherein the fastening member is configured to be operated to transversely move relative to the bracket between an unlocking position and a locking position;
wherein when the fastening member is located at the unlocking position, a fastening part of the fastening member is away from the at least one mounting member of the bracket;
wherein when the fastening member is located at the locking position, the fastening part of the fastening member is adjacent to the at least one mounting member of the bracket;
wherein the first supporting frame and the second supporting frame are movable relative to each other through a second passage.

17. The bracket device of the slide rail mechanism of claim 16, further comprising an elastic member located between the bracket and the fastening member, wherein the elastic member is configured to provide an elastic force to a lateral side of the fastening member, and the fastening member is configured to be transversely moved relative to the bracket from the locking position to the unlocking position in response to the elastic force of the elastic member.

18. A slide rail mechanism, comprising:
a rail member;
a first supporting frame movable relative to the rail member;
a second supporting frame movable relative to the first supporting frame;
a first bracket, the first bracket and the second supporting frame being movable relative to each other, the first bracket comprising a longitudinal wall and at least one mounting member adjacent to the longitudinal wall;
a fastening member; and
an elastic member configured to provide an elastic force to the fastening member;
wherein when the second supporting frame is moved relative to the first bracket along a direction from a first position to a second position, the fastening member is transversely moved relative to the first bracket from an unlocking position to a locking position;
wherein when the fastening member is located at the unlocking position, a fastening part of the fastening member is away from the at least one mounting member of the first bracket;
wherein when the fastening member is located at the locking position, the fastening part of the fastening member is adjacent to the at least one mounting member of the first bracket;
wherein the fastening member further comprises a leg part and an arm part, the arm part is connected between the leg part and the fastening part, the second supporting frame comprises a supporting structure; when the second supporting frame is located at the first position relative to the first bracket, the supporting structure does not support the leg part of the fastening member, such that the fastening member is held at the unlocking position by the elastic member; when the second supporting frame is located at the second position relative to the first bracket, the supporting structure supports the leg part of the fastening member to suppress the elastic force of the elastic member, such that the fastening member is held at the locking position.

19. The slide rail mechanism of claim 18, further comprising a supporting rail connected to the rail member, the first supporting frame being movable relative to the rail member through the supporting rail.

20. The slide rail mechanism of claim 19, wherein the supporting rail comprises an upper wall, a lower wall and a side wall connected between the upper wall and the lower wall, a first passage is defined by the upper wall, the lower wall and the side wall, at least one portion of the first supporting frame is movably mounted within the first passage.

21. The slide rail mechanism of claim 20, further comprising a second bracket, wherein the second bracket has a longitudinal wall and at least one mounting member adjacent to the longitudinal wall of the second bracket, and the longitudinal wall of the second bracket is connected to the side wall of the supporting rail.

22. The slide rail mechanism of claim 18, wherein the first supporting frame and the second supporting frame are movable relative to each other through a second passage, the first supporting frame has an opening and at least one contact wall adjacent to the opening, the second supporting frame comprises an abutting part configured to pass through the opening, and the abutting part is smaller than the opening.

23. The slide rail mechanism of claim 18, wherein the longitudinal wall of the first bracket has a first wall section and a second wall section, a space is defined between the first wall section and the second wall section, the first bracket and the second supporting frame are movable relative to each other through the space.

24. The slide rail mechanism of claim 18, wherein one of the second supporting frame and the first bracket comprises a limiting structure, the second supporting frame and the first bracket are movable relative to each other within a) limited range defined by the limiting structure.

25. The slide rail mechanism of claim 18, wherein the first bracket further comprises an end wall substantially perpendicularly connected to the longitudinal wall of the first bracket, the at least one mounting member is mounted on the end wall.

26. The slide rail mechanism of claim 18, wherein one of the supporting structure and the leg part comprises a guiding feature, the supporting structure is configured to abut against the leg part of the fastening member through the guiding) feature during a process of the second supporting frame being moved relative to the first bracket from the first position to the second position.

27. The slide rail mechanism of claim 18, further comprising a base, wherein the base has a contact wall and a supporting wall, the supporting wall is configured to support the leg part of the fastening member, the elastic member has a first part and a second part, the first part abuts against the contact wall, the second part abuts against the leg part of the fastening member.

\* \* \* \* \*